US008805091B1

(12) United States Patent  
Hensel et al.

(10) Patent No.: US 8,805,091 B1  
(45) Date of Patent: Aug. 12, 2014

(54) INCREMENTAL IMAGE PROCESSING PIPELINE FOR MATCHING MULTIPLE PHOTOS BASED ON IMAGE OVERLAP

(75) Inventors: Chase Hensel, San Francisco, CA (US); Guiheng Zhou, Beijing (CN)

(73) Assignee: Google Inc., Mountain View, CA (US)

( * ) Notice: Subject to any disclaimer, the term of this patent is extended or adjusted under 35 U.S.C. 154(b) by 167 days.

(21) Appl. No.: 13/588,681

(22) Filed: Aug. 17, 2012

(51) Int. Cl.
*G06K 9/68* (2006.01)

(52) U.S. Cl.
USPC ............................ 382/218; 382/225; 345/629

(58) Field of Classification Search
CPC .................................................. G06T 2200/32
USPC .................................... 382/218, 225; 345/629
See application file for complete search history.

(56) References Cited

U.S. PATENT DOCUMENTS

| | | | |
|---|---|---|---|
| 7,831,599 B2 * | 11/2010 | Das et al. | ....................... 707/737 |
| 2013/0124471 A1 * | 5/2013 | Chen et al. | .................... 707/624 |

\* cited by examiner

*Primary Examiner* — Mike Rahmjoo
(74) *Attorney, Agent, or Firm* — Lerner, David, Littenberg, Krumholz & Mentlik, LLP

(57) ABSTRACT

Systems, methods, and computer storage mediums are provided for matching multiple photographs together. An example method includes receiving a first collection of photographic images. The photographic images in the first collection are clustered into one or more composite sets of photographic images based on a comparison of the metadata associated with each photographic image in the first collection meeting a predetermined similarity threshold. An image overlap is determined between each photographic image within each of the one or composite sets of photographic images. When the image overlap exceeds a predetermined image overlap threshold, a pair of photographic images are matched, for all of the photographic images within each composite set of photographic images to form one or more composite images.

18 Claims, 9 Drawing Sheets

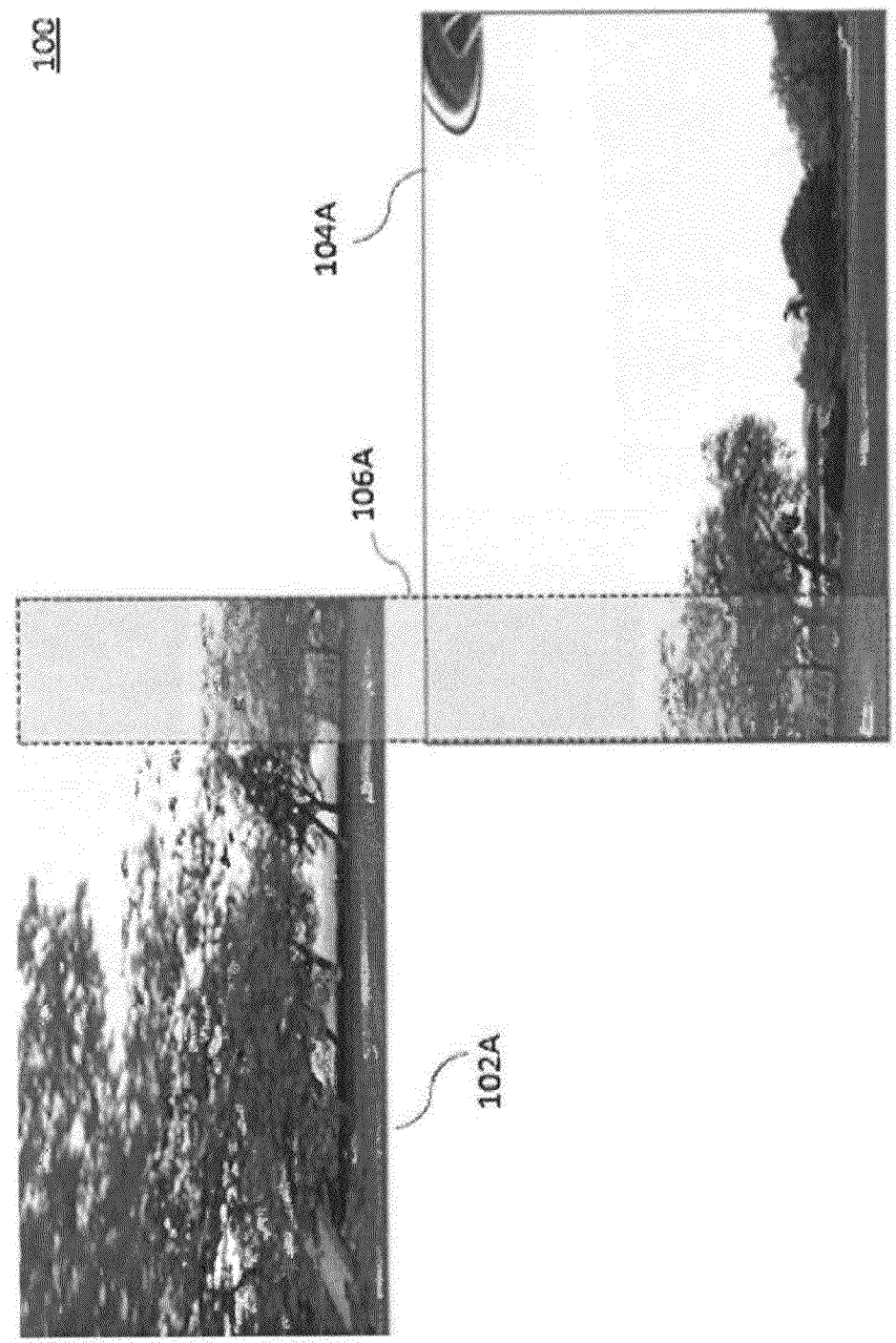

INCREMENTAL IMAGE PROCESSING PIPELINE FOR MATCHING MULTIPLE PHOTOS BASED ON IMAGE OVERLAP

BACKGROUND

1. Field

The embodiments described herein generally relate to organizing photographic images.

2. Background Art

Users wishing to combine a collection of photographic images captured from the same scene may utilize a variety of computer programs that determine a set of common features in the photographic images and match the photographic images to form a single panoramic image. The photographic images may be aligned by identifying the common features between the photographic images. These computer programs, however, are often designed to match photographic images by comparing each photographic image uploaded by a user with every photographic image that was previously uploaded in order to determine image overlaps and a set of common features. This can be a time expensive process, which detracts from the overall user experience.

BRIEF SUMMARY

The embodiments described herein include systems, methods, and computer storage mediums for providing an incremental image processing pipeline for matching multiple images. An example method embodiment includes receiving a first collection of photographic images, where each photographic image of the first collection of photographic images is associated with metadata. The metadata includes information related to at least a time of capture, a geolocation, and a field-of-view of a scene captured via an image capturing device. At least one of the time of capture, the geolocation, or the field-of-view of each photographic image is different. The photographic images of the first collection are clustered into one or more composite sets of photographic images. The clustering into composite sets is based on the metadata associated with each photographic image in the first collection meeting a predetermined similarity threshold.

An image overlap is determined between each photographic image within each of the one or more composite sets of photographic images. The image overlap indicates a set of common features between a pair of photographic images and includes at least a portion of an object captured in each of photographic images of the pair. The image overlap can be determined by comparing the field-of-view information from the respective metadata of the pair of photographic images. When the image overlap exceeds a predetermined image overlap threshold, the pair of photographic images, for all of the photographic images within each composite set of photographic images is matched to form one or more composite images. The one or more composite images are each associated with composite metadata.

Further features and advantages of the embodiments described herein, as well as the structure and operation of various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

FIG. 1A illustrates an incremental image processing pipeline for matching multiple images, according to an embodiment.

DETAILED DESCRIPTION

Figure 1B:
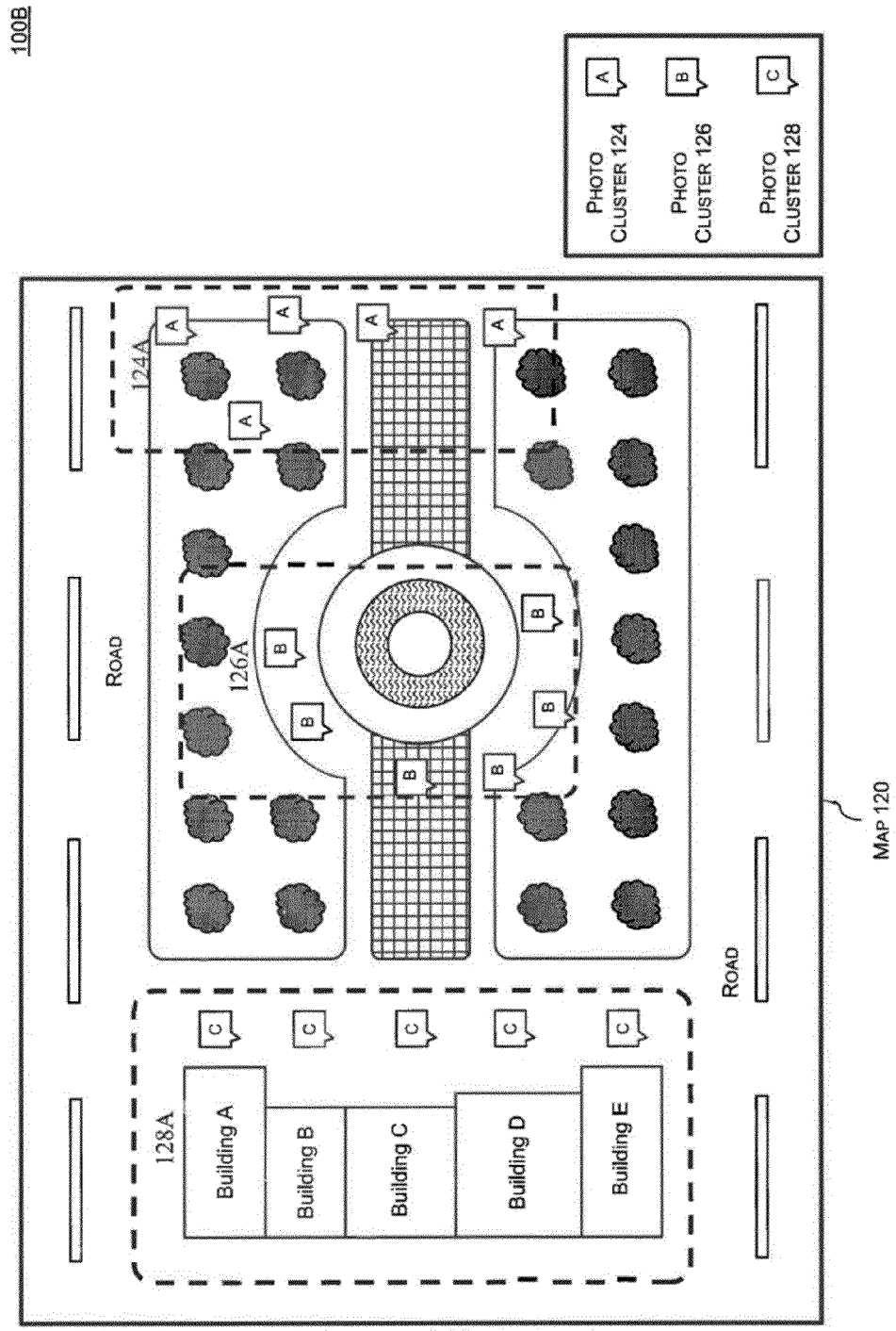
FIG. 1B illustrates clustered composite sets based on the real-time image processing pipeline, according to an embodiment.

Embodiments described herein may be used to provide an incremental image processing pipeline for matching multiple photographic images. The photographic images utilized by the embodiments may include photographic images captured from one scene at different times and different vantage points. A first collection of photographic images is received with each photographic image associated with respective metadata. The metadata of each photographic image includes information related to at least a time of capture, a geolocation, and a field-of-view of a scene captured via an image capturing device. The photographic images of the first collection are clustered into one or more composite sets of photographic images. The clustering into composite sets is based on the metadata associated with each photographic image in the first collection meeting a predetermined similarity threshold. The one or more composite sets of photographic images each describe the photographic images of the first collection that are candidates to be matched.

An image overlap is determined between each photographic image within each of the one or more composite sets of photographic images. The image overlap indicates a set of common features between a pair of photographic images and includes at least a portion of an object captured in each of photographic images of the pair. The image overlap is determined by comparing the field-of-view information from the respective metadata of the pair of photographic images. When the image overlap exceeds a predetermined image overlap threshold, the pair of photographic images, for all of the photographic images within each composite set of photographic images are matched to form a one or more composite images. The one or more composite images are each associated with composite metadata that is an aggregate of the metadata associated with each photographic image that makes up a respective composite image.

In the following detailed description, references to "one embodiment," "an embodiment," "an example embodiment," etc., indicate that the embodiment described may include a particular feature, structure, or characteristic. Every embodiment, however, may not necessarily include the particular feature, structure, or characteristic. Thus, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The terms "photographic image" and "photograph" are used interchangeably herein to refer broadly and inclusively to digital photographs or digital photos. The term "image" is used herein to refer broadly and inclusively to a digital photograph depicting an image of a scene and items within that scene, including, but not limited to, one or more persons, one or more landmarks, and/or one or more objects. Furthermore, the terms "photograph/photo," and "image" are used herein to refer to digital photos whether or not the terms are modified by the term "digital."

The term "real-time" is used herein to refer broadly and inclusively to a method, wherein events take place at the same or substantially same rate that a user experiences them. The term "real-time" used herein refers to a system which guarantees a response to a user command within strict time constraints. For example, real-time response times may be understood to be in the order of milliseconds, microseconds, or less than a second.

The terms "image capture device" and "image capturing device" are used interchangeably herein to refer broadly and inclusively to any device adapted to capture digital media, including photos and videos. Examples of such devices include, but are not limited to, digital cameras, mobile devices with an integrated digital camera. Furthermore, it is assumed herein that images are captured using such a device by manually pressing, selecting, or clicking a button or key that opens a shutter device for image exposure purposes.

The following detailed description refers to the accompanying drawings that illustrate example embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the detailed description is not meant to limit the embodiments described below.

This Detailed Description is divided into sections. The first section describes an example real-time image processing pipeline for matching multiple images, which may be performed by the embodiments. The second and third sections describe example system and method embodiments, respectively, that may be used to provide a real-time image processing pipeline for matching multiple images. The fourth section describes an example computer system that may be used to implement the embodiments described herein.

Example Incremental Image Processing Pipeline for Matching Multiple Images Together FIG. 1A illustrates an incremental image processing pipeline 100 for matching multiple images, according to an embodiment. Incremental image processing pipeline 100 is created by first comparing the metadata of a collection of images to determine sets of photographic images which are candidates to be matched and then matching photographic images from each set, when appropriate. For example, a first collection of photographic images that include photographic images 102A and 104A can be uploaded by a user. Each of the photographic images of the first collection of photographic images may be captured by the same user at different times and may capture the same scene at different fields-of-view or vantage points. For example, photographic image 104A may depict the same scene captured in photographic image 102A, but panned to the right by 30 degrees. Alternatively, photographic image 102A may depict a front, rear, side, or aerial view of an object in the scene, while photographic image 104A may capture the same object from a slightly different vantage point. The user may upload a first collection of photographic images including photographic images 102A and 104A to a server in order to create a panoramic tour based on the images. In real-time image processing pipeline 100, the first collection of images including photographic images 102A and 104A are images of one scene at slightly different geographical coordinates. As a result, incremental image processing pipeline 100 creates a panoramic tour by comparing the metadata of each photograph within the first collection of photographs to identify photos that are candidates to be matched, clustering the photos which are candidates to be matched into groups, and matching the photographs within each group based on common features.

Incremental image processing pipeline 100 operates as follows: A first collection of photographic images are received from a user. The first collection of photographic images can include a first photographic image 102A and a second photographic image 104A. For example, the first collection of photographic images including photographic images 102A and 104A may be uploaded by a user from a client computing device. Alternatively, the first collection of photographic images including photographic images 102A and 104A may be captured and uploaded automatically in response to a shutter click from an image capturing device, such as a camera. Each photographic image of the first collection of photographic images is associated with metadata. For example, first photographic image 102A and second photographic image 104A can be associated with a first and second metadata, respectively.

The metadata associated with each image of the first collection of photographic images may include information including, but not limited to, field-of-view information that describes an extent of a viewing window and orientation about an axis at which the image was captured, geo-location data that describes where the images were captured, and time of capture data that describes when the photographic images were captured. The field-of-view information describes a vantage point at which its associated respective image was captured. For example, a first field-of-view of an object within the scene captured by the image may be taken at the front, rear, or side of the object, while a second field-of-view of the object may be taken from an aerial view. The geo-location data of a photographic image indicates approximately where its associated respective image was captured by a user. For example, the geo-location data may include latitude and longitude coordinates of a geographic location where the image was captured. The time of capture data of a photographic image indicates approximately when its associated respective image was captured by a user. Time data may include a date, day, hour, and minute of when the image was captured. In an embodiment, at least one of the field-of-view, geolocation, or time data is different for each of the photographic images of the first collection uploaded by a user. Photographic images 102A and 104A of the first collection of photographic images may be captured at the same scene at a slightly different field-of-view, geolocation, or time.

Incremental image processing pipeline 100 receives the first collection of photographic images and clusters the photographic images of the first collection into one or more composite sets of photographic images. The clustering into composite sets is based on a comparison of the metadata associated with each photographic image in the first collection meeting a predetermined similarity threshold. The one or more composite sets of photographic images include the photographic images of the first collection that are candidates to be matched. For example, a metadata comparison between each photographic image within the first collection of photographic images may be performed. As a photograph within the first collection of photographic images is uploaded by a user, the metadata of the photographic image is compared against the metadata of all photographic images previously uploaded, according to an embodiment. The metadata comparison may then be used to determine whether the compared photographic images are potential candidates to be matched. When the comparison meets the predetermined similarity threshold, the compared photographic images may be candidates to be matched.

In some embodiments, the metadata similarity threshold may be a distance threshold or a geolocated area. The distance threshold or geolocated area indicates the maximum distance which cannot be exceeded in order for the compared photographic images to be identified as potential candidates to be matched. For example, as the first collection of photographic images are uploaded by the user, the first and second metadata of the first and second photographic images 102A and 104A can include geographic location (e.g., geolocation) data. The metadata may be compared to determine if the metadata similarity value between the photographic images is below a predetermined distance threshold or geolocated area. In this instance, the similarity of the metadata between the first and second photographic images is determined by comparing the geo-location data of the first and second metadata. The predetermined metadata similarity threshold which is a distance threshold may be set to a pre-configurable constant such as 500 meters. When the geographic location data of photographic images 102A and 104A are determined to be within 500 meters, photographic images 102A and 104A are identified as potential candidates to be matched. As additional images of the first collection of photographic images are uploaded, the metadata of each photographic image can be compared with all previously uploaded photographic images. When the metadata comparison meets the distance threshold or geolocated area, the compared photographic images are identified as potential candidates to be matched.

In another embodiment, the metadata similarity threshold may be a time threshold or duration of time. The time threshold or duration of time indicates the maximum time which cannot be exceeded in order for the compared photographic images to be identified as potential candidates to be matched. For example, as the first collection of photographic images are uploaded by the user, the first and second metadata of the first and second photographic images 102A and 104A can include the time data and the metadata may be compared to determine if the comparison between the photographic images meets a predetermined time threshold or duration of time. In this instance, the metadata comparison between the first and second photographic images is performed by comparing the time data of the first and second metadata. The predetermined metadata similarity threshold which is a time threshold or duration of time may be set to a pre-configurable constant such as 10 minutes. When a metadata comparison of a pair of photographic images determines that the photographic images have been taken less than 10 minutes apart, the pair of photographic images are identified as potential candidates to be matched. As discussed previously with respect to geographic location data, as all of the images of the first collection of photographic images are uploaded, a comparison of the metadata can be made to determine photographic images whose metadata comparison meets the time threshold and thus candidates to be matched.

When a metadata comparison between a pair of photographic images meets the predetermined metadata similarity threshold, one or more composite sets of photographic images are clustered, according to an embodiment. The one or more composite sets of photographic images include the photographic images of the first collection that are candidates to be matched. For example, the metadata of photographic images 102A and 104A of the first collection of photographic images may be compared. When the metadata comparison between the pair of photographic images 102A and 104A meets a predetermined distance or time threshold as discussed above, photographic images 102A and 104A are clustered into a composite set. As additional photographic images of the first collection are uploaded, the metadata of each additional photographic image is compared against all previously uploaded photographic images. All compared photographic images whose metadata comparison meets the predetermined metadata similarity threshold are sorted into the same composite sets. Thus, any photographic images of the first collection of photographic images will be sorted into the same composite set as photographic images 102A and 104A when the metadata comparison with photographic images 102A and 104A meets the metadata comparison threshold. When the metadata comparison with photographic images 102A and 104A does not meet the metadata similarity threshold, the respective photographic image will be sorted into another composite set with photographic images which are more suitable candidates to be matched. As a result, one or more composite sets of photographic images are clustered based on the metadata comparison, where each composite set only includes photographic images that have been identified as potential candidates to be matched.

FIG. 1B illustrates a cluster of composite sets 100B, according to an embodiment. A first collection of photographic images have been taken at map location 102 at map vicinities 124A, 126A and 128A. Map location 120 depicts a, scene with different buildings, roads, and objects. The user may travel around the scene capturing different images within different vicinities of the map at different times. The user may capture a collection of photographic images of the map location 120, via an image capturing device. Once the first collection of images captured by the user is received, the images from the first collection are clustered into one or more composite sets of photographic images. The clustering is based on a comparison of the metadata associated between each photographic image meeting a predetermined similarity threshold. For example, photo clusters 124B, 126B, and 128B may be formed where each photo cluster 124B, 126B, and 128B includes all the photographic images which are suitable candidates to be matched. The comparison of the metadata will initially indicate which images were captured within a substantially similar vicinity (geolocation) or at a substantially similar time. Thus, all the images taken within map vicinity 124A will be clustered into photo cluster 124B, while all the photographic images captured within map vicinity 126A are clustered into photo cluster 126B. Accordingly, all images taken within map vicinity 128A are clustered into photo cluster 128B.

In another embodiment, the metadata of an instant image of the first collection or set of images is compared with a predetermined number of identified images of the first collection of images. The instant image is the image received most recently in time and the predetermined number of identified images is a predetermined number of images received prior to the instant image. For example, uploads of photographic images can result in an initial comparison of the photographic images with a fixed number of images that were received prior to the instant image, such as the previous 5 images received. If the metadata comparison between an instant photographic image and any of the previously uploaded photographic images meets the predetermined metadata similarity threshold, then the instant photographic image is clustered into a composite set with those images. Additionally, if the metadata comparison does not meet the predetermined metadata comparison threshold, then additional composite sets are formed by clustering the instant photographic image with at least one additional, previously received photographic image that has similar metadata. By comparing only the metadata of each photographic image to the metadata of other photographic images to identify potential candidates to be matched, an incremental and fast real-time matching pipeline is provided.

In some embodiments, an image overlap is determined between each photographic image within each of the one of more composite sets of photographic images. The image overlap includes detecting a set of common features between a pair of photographic images. The pair of photographic images may include any two individual photographic images from a group of photographic images. Additionally, a pair of images may include an individual photographic image and a composite image. A composite image may include two or more photos that have been previously matched due to a set of common features. In an embodiment, each composite set of photographic images is traversed to identify all pairs of photographic images which may be matched. A pair of photographic images is matched when the image overlap exceeds a predetermined image overlap threshold.

In some embodiments, the predetermined image overlap threshold may be based on detecting and matching features of different perspectives, object detection, geographic location data, capture time, or a combination thereof. Any feature detection method may be used to determine the set of common features for the photographic images included in a pair. Such methods may include, for example, Features from Accelerated Segment Test ("FAST"), Speed Up Robust Features ("SURF"), or Scale-invariant feature transform ("SIFT"). These feature detection methods are merely provided as examples and are not intended to limit the embodiments in any way. For example, a predetermined image overlap threshold may be defined to be a feature match threshold. The feature match threshold indicates the number of common features that must be met in order to stitch two photographic images together. For example, the feature match threshold may be configured to be a predetermined constant N, where N represents the minimum amount of features that need to be matched in order to perform seamless matching of the photographic images. If the number of common features exceeds the predetermined constant N, then photographic images are matched.

For instance, the fields-of-view of photographic images 102A and 104A of one composite set may be compared to determine the number of common features between the first and second photographic images. Any matching method may be used to match the photographic images included in a pair. Such methods may include, for example, image registration, Structure from Motion (SFM), or stitching. These matching methods are merely provided as examples and are not intended to limit the embodiments in any way. In an example embodiment, incremental image processing pipeline 100 identifies an image overlap 106A by comparing the field-of-view of photographic image 102A with the field-of-view of photographic image 104A. Additionally, image overlap 106A may be identified using object recognition technology. One or more common features between the first image and the second image are detected and identified based on the comparison, according to an embodiment. The one or more common features may include at least a portion of an object captured in each photographic image in the pair of photographic images, where each photographic image captures a slightly different portion of a scene at different times. The one or more common features may include, for example, substantially similar coordinate data, an outline of a structure, intersecting lines, or other similar features captured in the photographic images.

In some embodiments, when the image overlap exceeds a predetermined image overlap threshold, the photographic images 102A and 104A are matched to form a composite image. The composite image is associated with a composite metadata that includes at the least the metadata from photographic images 102A and 104A. Matching of the photographic images is based on the set of common features identified by the image overlap. For example, the photographic images 102A and 104A may be aligned according to image overlap 106A, which includes the one or common features identified between the photographic images. When photographic images 102A and 104A are matched to form a composite image, one continuous image depicting the scene is formed. Thus, there is no duplication of any objects within the scene.

Figure 1C:
FIG. 1C illustrates a composite image based on the real-time image processing pipeline, according to an embodiment.

FIG. 1C illustrates a composite image based on the incremental image processing pipeline, according to an embodiment. Photographic images 102A and 104A are matched to create composite image 102C. According to an embodiment, composite image 102C includes composite metadata. The composite metadata may include metadata associated with the matched photographic images 102A and 104A. For example, the composite metadata may include a merged perspective information, geographic location data, or time data associated with the matched photographic images 102A and 104A.

Every photographic image within the composite set that includes photographic images 102A and 104A will be compared to determine if the image overlap exceeds the predetermined image overlap threshold. In an embodiment, an image overlap may be determined between each photographic image within a composite set of photographic images or between each photographic image and a previously matched composite image. When the image overlap is determined between each photographic image, the images will be matched as discussed above with respect to photographic images 102A and 104A. When the image overlaps between the composite image and a photographic image within the clustered composite set exceeds the predetermined image overlap threshold, the respective photographic image is matched with the first composite image, according to an embodiment. When the respective photographic images are matched with the composite image, the composite metadata is updated accordingly to include the respective metadata of the photographic image. In another embodiment, when the image overlap between the composite image and the respective photographic image is below the predetermined image overlap threshold, a second composite image is matched that includes the respective photographic image and at least one other additional photographic image within the composite set.

Figure 2:
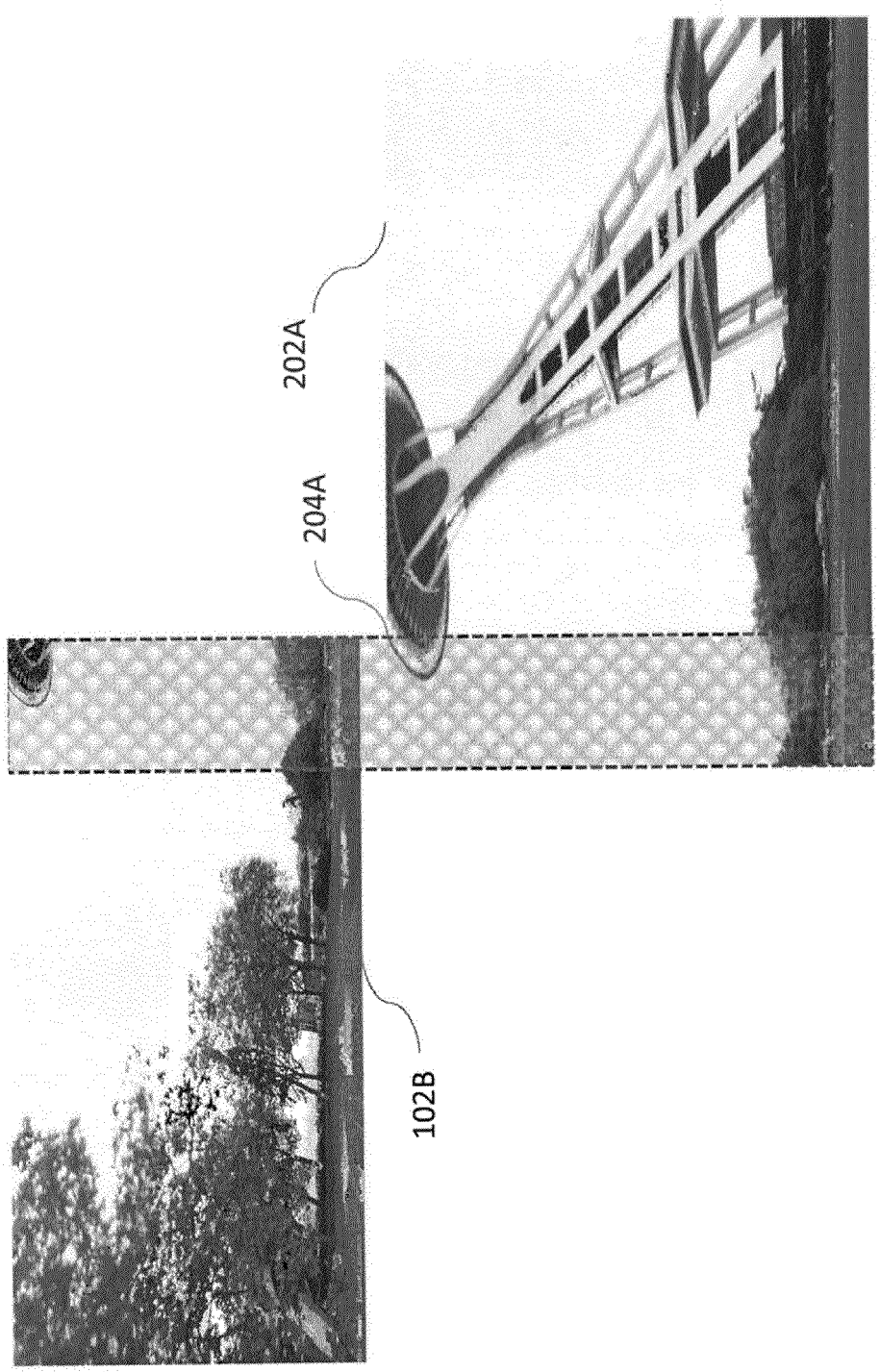
FIG. 2 illustrates a composite image comparison, according to an embodiment.

FIG. 2 illustrates a composite image comparison, according to an embodiment. One or more additional photographic images of the first collection of photographic images, such as a third photographic image 202A having a third metadata are a part of the same composite set as photographic images 102A and 104A. For example, a third photographic image 202A may be uploaded by the user as a part of the first collection of photographic images. The third photographic image 202A may have a relationship to composite image 102C which includes photographic images 102A and 104A. For example photographic image 202A may depict another portion of the scene depicted in photographic images 102A and 104A at a different perspective.

Figure 3:
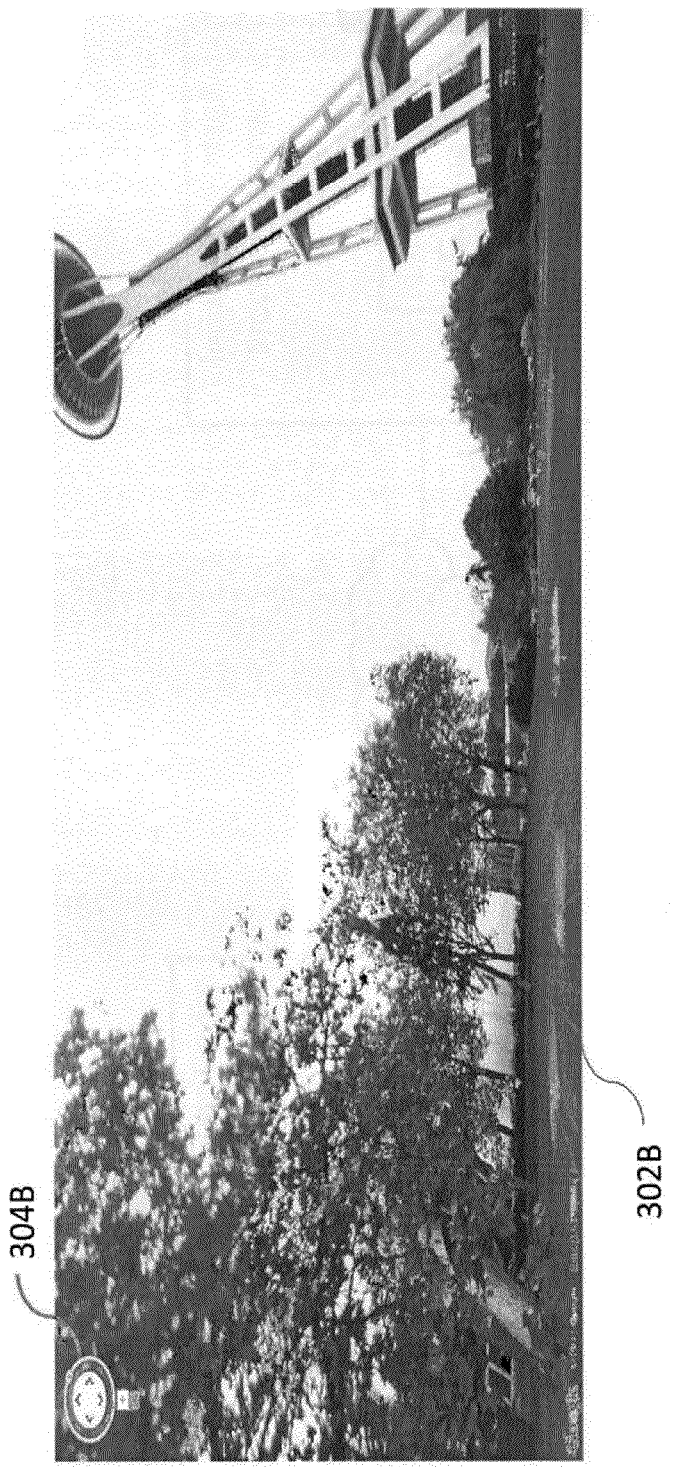
FIG. 3 illustrates a panoramic tour with a navigational control, according to an embodiment.

An image overlap is identified between the third photographic image 202A and composite image 102C. An image overlap is identified by comparing the field-of-view of third photographic image 202A and the composite image 102C and identifying common features. As discussed previously, the one or more common features may be based on substantially similar geolocation coordinate data, an outline of a structure, intersecting lines, or other similar features captured in the third photographic image 202A and the composite image 102C. In an example, when the image overlap is determined to exceed the predetermined image overlap threshold, the third photographic image 202A and the composite image 102C are matched based on aligning the set of common features. When the third photographic image is matched with the composite image, the composite metadata is updated accordingly to incorporate the third metadata. FIG. 3 illustrates the third photographic image 202A matched with composite image 102C.

Alternatively, as discussed previously, one or more additional photographic images that do not share a substantial set of common features with the composite image may be a part of the composite set of photographic images. For example, fourth and fifth photographic images may be a part of the first collection of photographic images and may have been clustered into the same composite set as photographic images 102A and 104A based on a comparison of the time data associated with the images. Thus, although the time data may be substantially similar between the images, an image overlap comparison may indicate that there are different features of the scene depicted which don't overlap. When an image overlap is calculated between the composite image 102C and the fourth and fifth photographic images respectively, the image overlap is below the predetermined image overlap threshold in this scenario. That is, the field-of-view or perspectives of the fourth and fifth photographic images are significantly different and do not satisfy the appropriate threshold for matching. The fourth and fifth photographic images depict a substantially different portion of the scene depicted in the composite image, such that matching with the composite image 102C cannot take place. Alternatively, the image overlap between the fourth and fifth photographic images is calculated. If the image overlap between the fourth and fifth photographic images exceeds the predetermined image overlap threshold, another composite image is formed by matching the fourth and fifth photographic images. The determination of an image overlap between the fourth and fifth photographic images and the subsequent matching is performed in a similar manner, as discussed above. If the image overlap between the fourth and fifth photographic images is below the predetermined image overlap threshold, then the fourth and fifth photographic images are stored within a database for future comparisons with additional photographic images of the composite set or additional photographs received.

Photographic images for each clustered composite set are compared to determine image overlaps and matching is performed when the image overlaps exceed the predetermined image overlap threshold. Thus, one or more composite images are generated from each composite set of photographic images. The composite images are subsequently compared in the same manner discussed above to determine if there is any image overlap between composite images of each clustered composite set. When the image overlap between composite image comparisons exceeds the predetermined image overlap threshold, the composite images within the composite set are matched. Additionally, the composite images generated from each composite set are compared and matched when appropriate. In this way, one continuous image can be generated quickly based on the upload of the first collection of images.

Since a metadata comparison is performed for each photographic image within the first collection of photographic images and groups of photographic images are clustered based on the metadata comparison, processing time is improved (i.e. decreased). Initially, only photographic images within a composite set will be compared for matching purposes, thus removing the need to perform an image overlap comparison between every single photographic image within the first collection. Therefore, incremental image processing pipeline 100 creates a two-pass system for matching photographic images. During the first pass, all photographic images of the first collection will have its metadata compared with all the other images of the first collection. The metadata comparison is not as time intensive as an image overlap comparison. Once the metadata for all of the images are compared and groups of photographic images are clustered based on being potential candidates to be matched, the matching of the photographic images take place during the second pass. Only those photographic images that have already been identified as potential candidates to be matched will be compared to determine if the appropriate image overlap exists to allow seamless matching. Thus, the processing time to match photographic images will be decreased, since an image overlap does not have to be determined between every photographic image within the collection. Rather the clustering of photographic images into composite sets acts as a filter in order to perform image overlap comparisons and matching between only those photographic images that are substantially similar.

Returning to FIG. 3, a panoramic tour with a navigational control is also illustrated, according to an embodiment. Panoramic tour 302B with navigational control 304B is created once a user has uploaded the first collection of photographic images and all of the images have been matched together using clustering and matching techniques described above. For example, if the first collection of photographic images is comprised of three photographic images, once the user has uploaded first and second photographic images 102A and 104A of FIG. 1A and third photographic image 202A of FIG. 2, the images may be clustered and matched together in sequential order to generate a panoramic tour 302B with navigational control 304B.

In panoramic tour 302B with navigational control 304B, the user can navigate within the panoramic image data which has been matched together. For example, the user can click and drag around on the image to view a 360 degree perspective of the scene. Moreover, a variety of user interface elements may be added to the underlying panoramic image data to facilitate navigation. These elements include navigation inputs such as, for example, zoom, panning and tilt controls as a part of navigation control 304B. Moreover, navigation buttons may be rendered directly in the panorama itself. For example, selecting a navigation button may enable a user to navigate to another adjacent or nearby panorama. In this way, the user may change the perspective within the panoramic image and may navigate to other panoramic images.

FIGS. 1A, 1B, 1C, 2, and 3 are provided as examples and are not intended to limit the embodiments described herein.

Example System Embodiments

Figure 4:
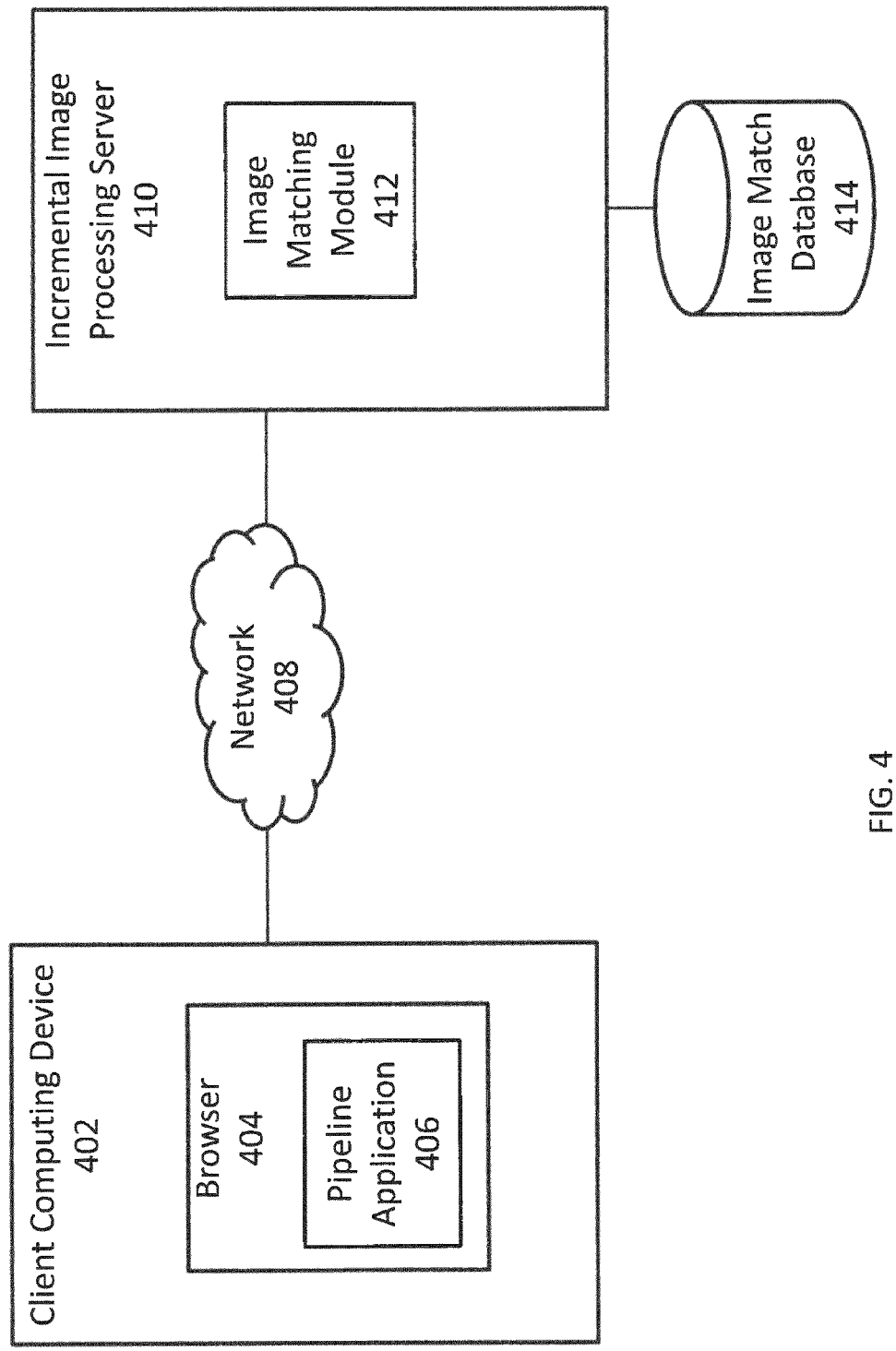
FIG. 4 illustrates an example system for an incremental image processing pipeline for matching multiple images, according to an embodiment.

FIG. 4 illustrates an example system for an incremental image processing pipeline for matching multiple images together, according to an embodiment. System 400 includes client computing device 402 and incremental image processing server 410. Client computing device 402 includes browser 404 and pipeline application 406. Incremental image processing server 410 includes image matching module 412 and is coupled to an image match database 414.

In general, system 400 operates as follows: A first collection of photographic images, each image including respective metadata, is uploaded by a user to incremental image processing server 410 via pipeline application 406 on browser 404. The metadata of each of the photographic images of the first collection include information related to field-of-view that indicates a vantage point where the respective photographic images were captured respectively by an image capturing device. Additionally, the metadata of each of the photographic images include geolocation data and time of capture data, indicating approximately where and when the images were captured. In an embodiment, at least one of the field-of-view data, time data, or geolocation data of each photographic image is different. The uploaded images of the first collection are sent to incremental image processing server 410 utilizing network 408. Upon receipt of the first collection of photographic images by incremental processing server 410, image matching module 412 compares the associated metadata between all of the images of the first collection. If the metadata comparison between a pair of photographic images meets a predetermined metadata similarity threshold, the pair of photographic images is clustered into a composite set of photographic images. One or more composite sets of photographic images are clustered, where each composite set includes photographs which have been identified as potential candidates to be matched.

An image overlap is identified for all the photographic images in a respective composite set based on a comparison of the fields-of-view. When the image overlap for a pair of compared photographs exceeds a predetermined image overlap threshold, the pair of photographic images are matched based on a set of common features to a form a composite image associated with composite metadata that includes at least the metadata of the respective images. The composite image is then stored within image match database 414. Additional image overlaps may be determined based on a comparison with the composite image. When the one or more additional image overlaps between the first composite image and respective additional photographic image is below the predetermined image overlap threshold, a second composite image is matched that includes the respective additional photographic image and at least one other additional photographic image. The second composite image is also stored within image match database 414.

Incremental image processing server 410 may receive one or more additional collections of photographic images. Each image of the additional collections of photographic image is associated with respective metadata and each respective metadata includes perspective data, geo-location data and time of capture data, which are different. Incremental image processing server 410 is configured to determine if any images of a collection of images are candidates to be matched with any of the photographic images of the first collection based on a metadata comparison. Composite sets of photographic images are clustered when the metadata comparison identifies images that are candidates to be matched, as discussed previously. If the metadata comparison identifies photographic images within the collection of photographic images as being candidates to be matched with images of the first collection of photographic images, one or more additional image overlaps are determined which indicate a set of common features between a respective additional photographic image of the additional collections and at least one of the photographic images of the first collection. When the one or more additional image overlaps exceeds the predetermined image overlap threshold, the respective additional photographic image is matched with an image of the first collection. When the one or more additional image overlaps is below the predetermined image overlap threshold, one or more additional composite images are matched that include the respective additional photographic image and at least one other additional photographic image. The one or more additional composite images are also stored within image match database 414.

Once all images of a scene are uploaded by a user, incremental image processing server 410 generates a panoramic tour with navigational controls, which may be displayed and interacted with using browser 404 on client computer device 402.

Network 408 may be any network or combination of networks that can carry data communications. Such a network 408 may include, but is not limited to, a local area network, metropolitan area network, and/or wide area network such as the Internet. Network 408 can support protocols and technology including, but not limited to, World Wide Web (or simply the "Web"), protocols such as a Hypertext Transfer Protocol ("HTTP") protocols, and/or services. Intermediate web servers, gateways, or other servers may be provided between components of the system shown in FIG. 4, depending upon a particular application or environment.

Client computing device 402 is a processor-based electronic device that is manipulated by a user and is capable of providing photographic images to incremental image processing server 410 over network 408. Client computing device 402 may include, for example, a mobile computing device (e.g. a mobile phone, a smart phone, a personal digital assistant (PDA), a navigation device, a tablet, or other mobile computing devices). Client computing device 402 may also include, but is not limited to, a central processing unit, an application-specific integrated circuit, a computer, workstation, a distributed computing system, a computer cluster, an embedded system, a stand-alone electronic device, a networked device, a rack server, a set-top box, or other type of computer system having at least one processor and memory. A computing process performed by a clustered computing environment or server farm may be carried out across multiple processors located at the same or different locations. Hardware can include, but is not limited to, a processor, memory, and a user interface display.

Client computing device 402 may include a camera (not shown). The camera may include any digital image capturing device such as, for example, a digital camera or an image scanner. While a camera may be included in client computing device 402, it is not intended to limit the embodiments in any way. Alternative methods may be used to acquire photographic images such as, for example, retrieving photographic images from a local or networked storage device.

Browser 404 may be any kind of browser. Browser 404 may also include a pipeline application 406. Pipeline application 406 may extend the functionality of browser 404 and can be configured provide one or more images to be matched to incremental image processing server 410. For example, pipeline application 406 may be a browser extension downloaded from a web server and installed on client computing device 402 as part of browser 404. Pipeline application 406 may be developed by an application developer on client computing device 402 or any other computing device. A programming language, such as JavaScript may be used to develop pipeline application 406 on client computing device 402. Pipeline application 406 may then be stored locally on client computing device 402. Alternatively, pipeline application 406 may be uploaded to a pipeline application server (not shown). Pipeline application server may distribute pipeline application 406 to additional client computing devices due to a request from a user.

Incremental image processing server 410 can include any server system capable of processing photographic images. Incremental image processing server 410 may include, but is not limited to, a central processing unit, an application-specific integrated circuit, a computer, workstation, a distributed computing system, a computer cluster, an embedded system, a stand-alone electronic device, a networked device, a rack server, a set-top box, or other type of computer system having at least one processor and memory. A computing process performed by a clustered computing environment or server farm may be carried out across multiple processors located at the same or different locations. Hardware can include, but is not limited to, a processor, memory, and a user interface display. Incremental image processing server 410 may match multiple photographic images as they are received and store the composite image on image matching database 414. Composite images stored on image match database 414 may be used to generate a panoramic tour with navigation controls, which then may be transmitted to computing device 402 for display.

Figure 5:
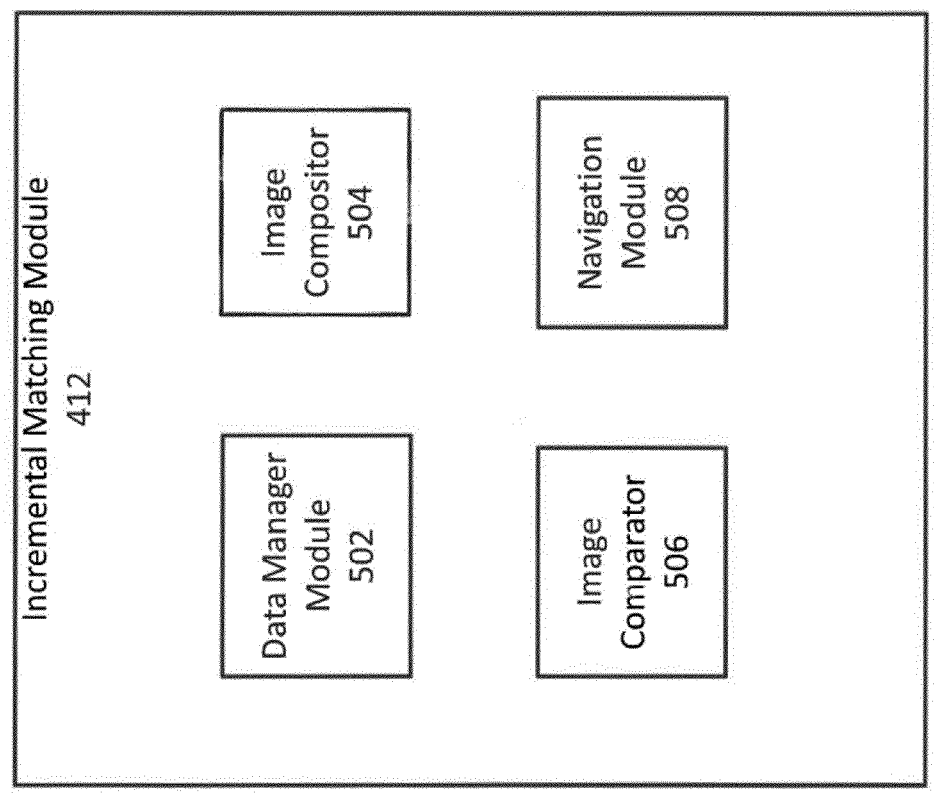
FIG. 5 illustrates an example image matching module for an incremental image processing pipeline for matching multiple images, according to an embodiment.

FIG. 5 illustrates an example image matching module for an incremental image processing pipeline for matching multiple images together, according to an embodiment. Image matching module 412 includes data manager module 502, image compositor 504, image comparator 506 and navigation module 508.

A. Data Manager Module

Data manager module 502 is configured to receive a first collection of photographic images. Each image of the first photographic image is associated with metadata. For example, data manager module 502 may receive a first collection of photographic image from a user utilizing a computing device. The user may upload the images from a storage device connected to the computing device, for example. The metadata of each image may include information including, but not limited to, field-of-view information, geo-location data and a time of capture when the photographic images were taken. The field-of-view information describes an extent of a viewing capture window and, optionally, an orientation about an axis of a vantage point where its associated respective image was captured. For example, the field-of-view may indicate that the image was captured at a certain perspective and at a certain angle. The geolocation data of a photographic image indicates approximately where its associated respective image was captured by a user. For example, the geolocation data may include latitude and longitude coordinates corresponding to a geographic location where the image was captured. The time of capture data of a photographic image indicates approximately when its associated respective image was captured by a user.

In some embodiments, data manager module 502 is configured to receive one or more additional collections of photographic images from the user. The user may continue to upload one or more additional collections of photographic images from a client computing device. Each photograph of the additional collection of photographic image is associated with a respective metadata. The respective metadata for each additional photographic image includes field-of-view, time of capture, and geolocation information. In an embodiment, the field-of-view, geo-location, and time of capture of each additional photographic image of the additional collections are different from the field-of-view, geo-location, and time of capture of the images of the first collection.

In some embodiments, the photographic images received by data manager module 502 can be related. For example, the photographic images may all depict different portions of a scene taken by the user at different times and different vantage points. By uploading photographic images depicting different portions of the same scene, the photographic images may be matched together to generate a seamless panoramic view of the entire scene.

B. Image Comparator Module

In response to data manager module 502 receiving a first collection of photographic images, image comparator module 506 is configured to compare the associated metadata of each photographic image of the first collection. A metadata comparison is performed by comparing the associated metadata for each photographic image within the first collection of photographic images. As a photograph within the first collection of photographic images is uploaded by a user, the metadata of the photographic image is compared against the metadata of all photographic images previously uploaded.

The metadata comparison determines whether the compared photographic images are potential candidates to be matched. Image comparator module 502 is configured to determine whether a metadata comparison meets a predetermined similarity threshold. When the metadata comparison meets the predetermined metadata similarity threshold, the compared photographic images are identified as candidates to be matched. In an embodiment, the metadata similarity threshold may be based on a geolocated area or a duration of time, where the metadata of images are compared and if the associated photographic images are within a certain distance or were taken within a certain time span, the compared photographic images are identified as candidates to be matched.

When a metadata comparison between a pair of photographic images meets the predetermined metadata similarity threshold, image comparator module 506 is configured to cluster one or more composite sets of photographic images. The one or more composite sets of photographic images include the photographic images of the first collection that are sorted together and are candidates to be matched. For example, the metadata of all the photographic images of the first collection of photographic images may be compared. When the metadata comparison between a pair of photographic images meets a predetermined distance or duration of time as discussed above, the pair of photographic images are clustered into a composite set. As the metadata of the additional photographic images of the first collection are compared against all the previously uploaded images, all compared photographic images whose metadata comparison meets the predetermined metadata similarity threshold are clustered into the same composite set. In some cases, photographic images may be clustered into multiple composite sets. When the metadata comparison between a pair of photographic images is does not meet the metadata similarity threshold, the respective photographic image will be clustered into another composite set with photographic images which are more similar and suitable candidates to be matched. As a result, one or more composite sets of photographic images are clustered based on the metadata comparison, where each composite set only includes photographic images which have been identified as potential candidates to be matched. In this way, image comparator module 506 acts as a filter for the photographic images prior to any attempts at matching the photographic images. By clustering photographic images together that share substantially similar geo-location or time data, only the photographic images within each composite set will be used during matching determination.

In some embodiments, image comparator module 506 is configured to compare a composite image associated with a composite metadata with the one or more additional photographic images received by data manager module 502. A composite image is an image which includes at least two photographic images which were previously matched. Image comparator module 506 is configured to perform additional metadata comparisons between each additional photographic image and the composite image. The additional photographic image is clustered into a set of photographic images with the composite image, if the metadata similarity value is below the predetermined metadata similarity threshold.

Image comparator module 506 is further configured to determine an image overlap for each photographic image in each clustered composite set of photographic images, according to an embodiment. An image overlap is a set of common features for at least one pair of photographic images from a group of photographic images. The pair of photographic images may include any two individual photographic images from a group of photographic images. Additionally, a pair of images may include an individual photographic image and a composite image. A composite image may include two or more photos that have been matched together due to common features. The set of common features may include at least a portion of an object captured in each photographic image in the first and second photographic images, where each photographic image captures a slightly different portion of a scene at a different time and vantage point. The set of common features may include, for example, substantially similar coordinate data, an outline of a structure, intersecting lines, or other substantially similar features captured in the photographic images. Image comparator module 502 may utilize any number of feature detection methods known to those of skill in the art to identify the first image overlap.

Image comparator module 506 is configured to compare each image overlap with a predetermined image overlap threshold to determine if a pair of photographic images can be matched. According to an embodiment, a predetermined image overlap threshold may be based on detecting features, comparing fields-of-view, geographic location data (e.g., geolocation), capture time, or a combination thereof. Any feature detection method may be used to determine the set of common features for the photographic images included in a pair. Such methods may include, for example, Features from Accelerated Segment Test ("FAST"), Speed Up Robust Features ("SURF"), or Scale-invariant feature transform ("SIFT"). These feature detection methods are merely provided as examples and are not intended to limit the embodiments in any way.

In an embodiment, a predetermined image overlap threshold is a feature match threshold, where the feature match threshold indicates a level of feature matching that must be met in order to match two photographic images. If a pair of photographic images is compared and the number of common features exceeds the predetermined feature match threshold value, then matching the pair of photographs is appropriate. In another embodiment, a predetermined image overlap threshold may be defined to be a distance threshold, where the two photographic images are matched if their geographic locations are below the distance threshold. The predetermined image overlap threshold may be set to, for example, 20 meters. When the geographic location data of two compared photographic images is determined to be within 20 meters, the two photographic images may be matched to form a composite image associated with composite metadata. Further discussion regarding the formation of the composite image takes place below.

Image comparator module 506 is configured to identify from all the photographic images in a respective composite set, all pairs of photographic images whose image overlap exceeds the predetermined image overlap threshold. In an embodiment image comparator module 506 is configured to determine an image overlap between one or more composite images associated with a composite metadata and one or more additional photographic images from collections of photographic images other than the first collection. Image comparator module 506 is configured to calculate one or more additional image overlaps between each additional photographic image and each composite image. For example, upon receipt of a second collection of photographic image by data manager 502, image comparator module 506 may compare the photographic images of the second collection with all the previously generated composite images of the first collection. Image comparator module 506 may compare the metadata of each photographic image of the second collection and each of the composite images to determine a metadata similarity value. If the metadata comparison meets the predetermined metadata similarity threshold, the respective photographic images of the second collection are clustered with the compared composite image. Additional image overlaps within the clustered sets will be determined and if the image overlaps exceed he predetermined image overlap threshold, the respective photographic image and compared composite image are identified as images that will be matched.

In another embodiment, image comparator module 506 is configured to compare an instant image of the first collection with a predetermined number of identified images of the first collection. According to an embodiment, the instant image is the image received most recently in time and the predetermined number of identified images is a predetermined number of images received prior to the instant image. For example, when a user uploads a set of photographic images depicting different portions of a scene, each photographic image does not share the same set of similar features. If a user uploaded a set of 10 photographic images in sequential order based on when the images were taken, it can be assumed that the first set of 5 images have a greater image overlap, than the second set of 5 photographic images. The assumption is based on the idea that when a user takes multiple photographic images with the intent of creating a panoramic experience, they take the photographic images panning across the scene in either a horizontal or vertical pattern. By comparing the metadata of each photographic image as it is received to a fixed number of images, an incremental and fast real-time matching pipeline is provided, since each photographic image does not have to be compared with every photographic image that was previously received.

C. Image Compositor Module

Once the first collection of photographic images are received by data manager module 502 and compared by image comparator module 506, image compositor module 504 is configured to match all photographic images within each clustered composite set to form one or more composite images. Image compositor module 504 is configured to match a pair of compared photographic images when the identified image overlap exceeds a predetermined image overlap threshold. Any matching method may be used to match the photographic images included in a pair. Such methods may include, for example, image registration, Structure from Motion (SFM), or stitching. These matching methods are merely provided as examples and are not intended to limit the embodiments in any way. For example, a pair of photographic images will be matched based on detecting a set of common features between a pair of images and aligning the images based on the features detected.

In an embodiment, one or more additional composite images may be created by image compositor module 504. The additional composite images may be generated based on matching a predetermined number of identified images or when a received photographic image does not have an appropriate image overlap with a composite image. For example, image compositor module 504 may be configured to match every 5 images within a composite set based on the predetermined number of identified images being set to a constant of 5. Furthermore, as each image is received by data manager module 506, each instant image may only be compared with the previous 5 photographic images received and matched if the image overlap threshold is met. Additionally, if one or more additional photographic images do not share common features with a composite image, one or more additional composite images may be created by matching the one or more additional photographic images when they share common features. In an embodiment, each additional composite image may be matched once all photographic images are received by data manager module 502.

D. Navigation Module

Navigation module 508 is configured to generate a panoramic tour with a navigational control, according to an embodiment. A panoramic tour with a navigational control is generated by navigation module 508, once a user has uploaded a set of images and all of the images have been matched using a sequential metadata comparison scheme. Once the panoramic tour with a navigational control is generated, the user can navigate within the panoramic image data which has been matched. For example, the user can click and drag around on the image to look around the scene in a 360 degree manner. Moreover, a variety of user interface elements may be added to the underlying panoramic image data to facilitate navigation. These elements include navigation inputs such as, for example, zoom, panning, and tilt controls. For example, selecting a navigation button may enable a user to navigate to another adjacent or nearby panorama. In this way, the user may change the perspective within the panoramic image and may navigate to other panoramic images.

Various aspects of embodiments described herein can be implemented by software, firmware, hardware, or a combination thereof. The embodiments, or portions thereof, can also be implemented as computer-readable code. The embodiment in systems 400 and 412 are not intended to be limiting in any way.

Example Method Embodiments

Figure 6:
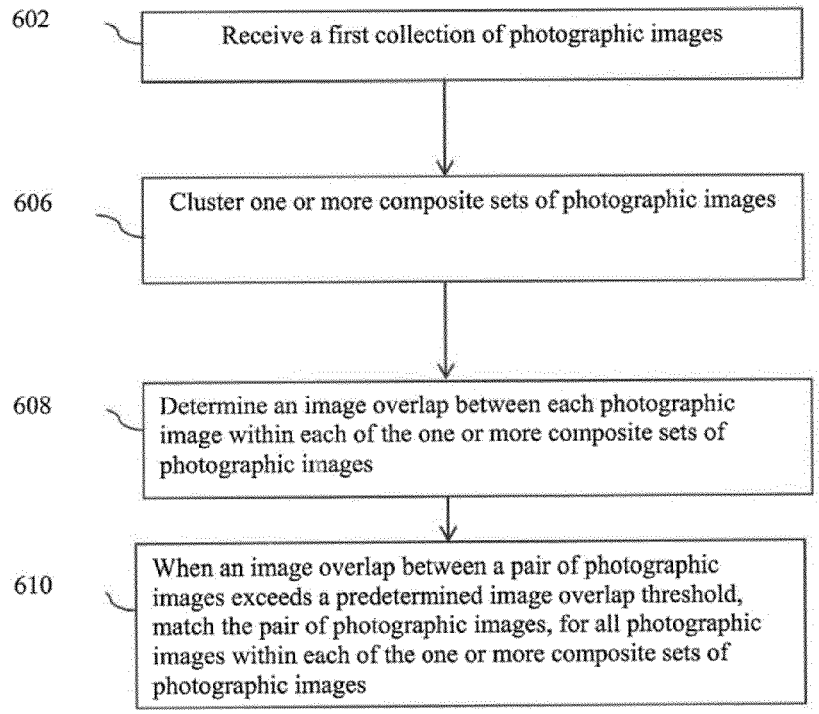
FIG. 6 is a flowchart illustrating a method that may be used to provide an incremental image processing pipeline for matching multiple images according to an embodiment.

FIG. 6 is a flowchart illustrating example method 600 for providing an incremental image processing pipeline for matching multiple images together. While method 600 is described with respect to an embodiment, method 600 is not meant to be limiting and may be used in other applications. Additionally, methods 600 may be carried out by, for example, system 400 in FIG. 4 or system 412 in FIG. 5.

Incremental Image Processing Pipeline Based on Image Perspectives

FIG. 6 illustrates a method 600 used to provide an incremental image processing pipeline for matching multiple images based on a comparison of metadata.

A first collection of photographic image is received at step 602, where each photographic image of the first collection of photographic images is associated with a respective metadata. In an embodiment, the first collection of photographic images may be received by data manager module 502 of image matching module 412. For example, a user may upload a first collection of photographic images using an application on a client computing device. The first collection of photographic images may depict different fields-of-view of a scene at different times and geo-locations. For example, each photographic image of the first collection of photographic images may depict a slightly different portion of the same scene. For instance, a second photographic image of the first collection of photographic images could depict the same scene of a first photographic image of the first collection but panned to the right by 30 degrees.

At step 604, one or more composite sets of photographic images are clustered. In an embodiment, the one or more composite sets of photographic images may be clustered by image comparator module 504 of image matching module 412. The one or more composite sets of photographic images include the photographic images of the first collection that are candidates to be matched, according to an embodiment. For example, the metadata of a pair of photographic images of the first collection of photographic images may be compared. The metadata comparison is performed by comparing the metadata for each photographic image of the first collection of photographic images. The metadata comparison may be based on a comparison of the time date and/or geo-location data, according to an embodiment.

As a photograph within the first collection of photographic images is uploaded by a user, the metadata of the photographic image is compared against the metadata of all photographic images previously uploaded. The metadata comparison determines whether the compared photographic images are potential candidates to be matched. When the metadata comparison between any particular pair of photographic images meets a predetermined metadata similarity threshold, the pair of photographic images is clustered into a composite set. As the metadata of additional photographic images is compared against the metadata of the photographs in the composite set, the additional photographic images are added to the composite set when their respective metadata meet the predetermined metadata similarity threshold with the metadata of the photographic images in the composite set. Thus, any photographic images of the first collection of photographic images will be clustered into the same composite set when their metadata meets the predetermined metadata similarity threshold (i.e. substantially similar). On the other hand, when the metadata of the additional photographic images does not meet the predetermined metadata similarity threshold, the additional photographic images will not be clustered in the composite set. The additional photographic images, however, may be clustered in other composite sets.

At step 606, an image overlap is determined between each photographic image within each of the one or more composite sets of photographic images. In an embodiment, an image overlap may be determined by image comparator module 506 of image matching module 412. An image overlap is a set of matching or common features detected between a pair of photographic images. The set of matching or common features may include at least a portion of an object captured in each photographic image, where each photographic image captures a slightly different portion of a scene at a different time and vantage point. The set of matching or common features may include, for example, an outline of a structure, intersecting lines, or other substantially similar features captured in the photographic images. Image comparator module 506 may utilize any number of feature detection methods known to those of skill in the art to identify the first image overlap. Such methods may include, for example, Features from Accelerated Segment Test ("FAST"), Speed Up Robust Features ("SURF"), or Scale-invariant feature transform ("SIFT"). These feature detection methods are merely provided as examples and are not intended to limit the embodiments in any way.

At step 608, when an image overlap between a pair of photographic images exceeds a predetermined image overlap threshold, the pair of photographic images are combined. Matching of the photographic images is performed after detecting and extracting the common features between a pair of photographic images. Such methods of matching images may include image registration, Structure From Motion (SFM), or stitching of images. All images within each composite set of photographic images are compared and matched based on the image overlap exceeding the predetermined image overlap threshold. In an embodiment, the photographic images are combined together by image compositor module 504 of image matching module 412. A pair of photographic images are combined together to form a composite image based on the set of common features identified by the image overlap, for instance. For example, the one or more common features identified between a pair of photographic images may be aligned, such that when the two photographic images are matched, one continuous image depicting the scene is formed, where there is no duplication of any objects within the scene. By matching the pair of photographic images to form a composite image, the scene depicted in the photographic image may be represented as a panorama. The composite image includes an associated composite metadata, according to an embodiment. For example, the composite metadata may include a merged field-of-view data, time data, or geolocation data associated with the matched photographic images.

A panoramic tour including each received photographic image is generated with a navigational control, according to an embodiment. A panoramic tour with a navigational control is generated once a user has uploaded a set of images and all of the images have been matched using a sequential metadata comparison scheme. Once the panoramic tour with a navigational control is generated, the user can navigate within the panoramic image data which has been matched together. For example, the user can click and drag around on the image to look around the scene in a 360 degree manner.

Example Computer System

Figure 7:
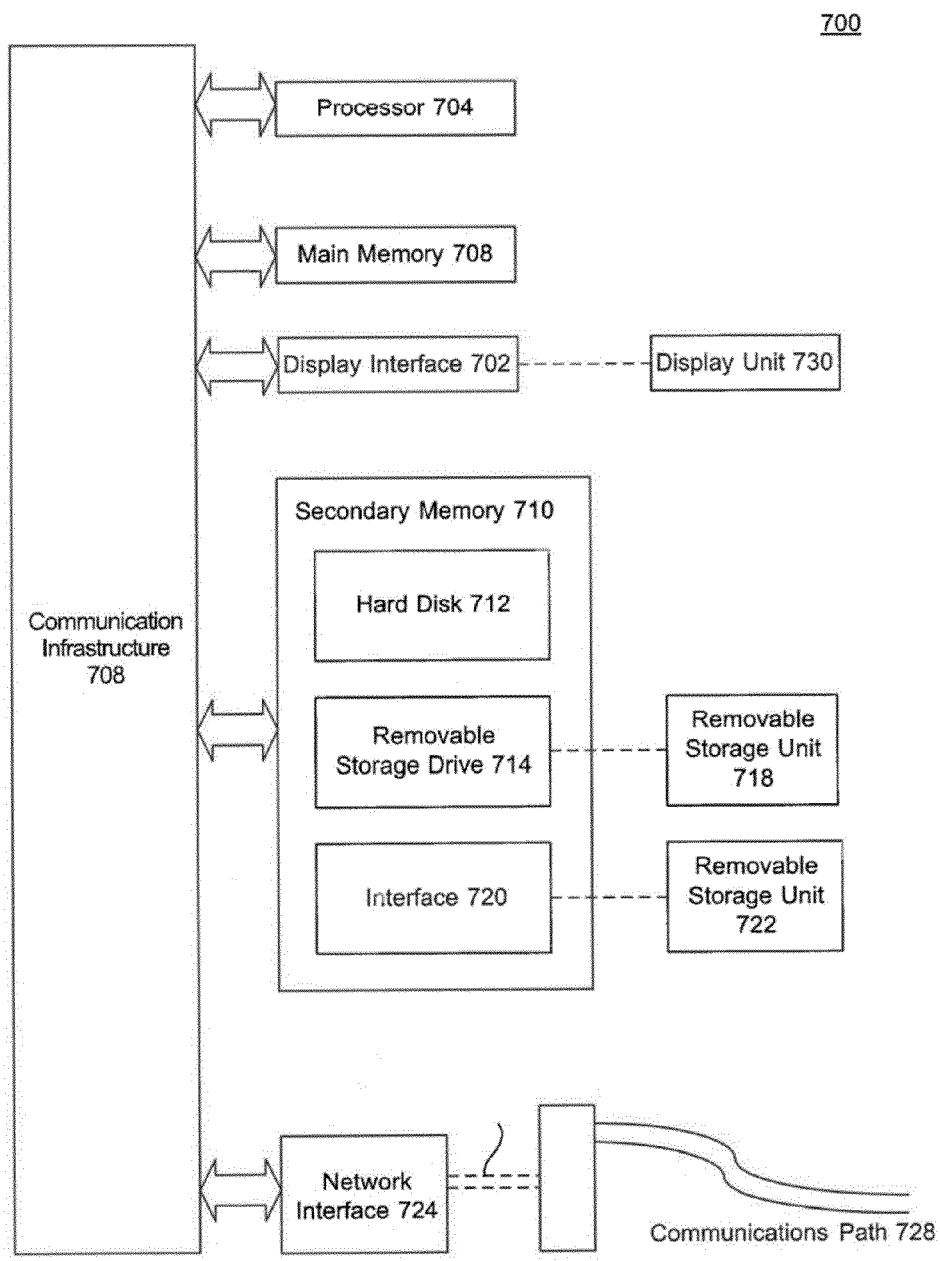
FIG. 7 illustrates an example computer in which the embodiments described herein, or portions thereof, may be implemented as computer-readable code.

FIG. 7 illustrates an example computer 700 in which the embodiments described herein, or portions thereof, may be implemented as computer-readable code. For example, data manager 502, image compositor 504, image comparator 506, and navigation module 508 of image matching module 412 may be implemented in one or more computer systems 700 using hardware, software, firmware, computer readable storage media having instructions stored thereon, or a combination thereof.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above described embodiments. A processor device may be a single processor, a plurality of processors, or combinations thereof. Processor devices may have one or more processor "cores."

Various embodiments are described in terms of this example computer system 700. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 704 may be a single processor in a multi-core/multiprocessor system, such system operating alone, or in a cluster of computing devices operating in a cluster or server farm. Processor device 704 is connected to a communication infrastructure 706, for example, a bus, message queue, network, or multi-core message-passing scheme. Computer system 700 may also include display interface 702 and display unit 730.

Computer system 700 also includes a main memory 708, for example, random access memory (RAM), and may also include a secondary memory 710. Secondary memory 710 may include, for example, a hard disk drive 712, and removable storage drive 714. Removable storage drive 714 may include a floppy disk drive, a magnetic tape drive, an optical disk drive, a flash memory drive, or the like. The removable storage drive 714 reads from and/or writes to a removable storage unit 718 in a well-known manner. Removable storage unit 718 may include a floppy disk, magnetic tape, optical disk, flash memory drive, etc. which is read by and written to by removable storage drive 714. As will be appreciated by persons skilled in the relevant art, removable storage unit 718 includes a computer readable storage medium having stored thereon computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 may be in the form of signals, which may be electronic, electromagnetic, optical, or other signals capable of being received by communications interface 724. These signals may be provided to communications interface 724 via a communications path 726. Communications path 726 carries signals and may be implemented using wire or cable, fiber optics, a phone line, a cellular phone link, an RF link or other communications channels.

In this document, the terms "computer storage medium" and "computer readable storage medium" are used to generally refer to media such as removable storage unit 718, removable storage unit 722, and a hard disk installed in hard disk drive 712. Computer storage medium and computer readable storage medium may also refer to memories, such as main memory 708 and secondary memory 710, which may be memory semiconductors (e.g. DRAMs, etc.).

Computer programs (also called computer control logic) are stored in main memory 708 and/or secondary memory 710. Computer programs may also be received via communications interface 724. Such computer programs, when executed, enable computer system 700 to implement the embodiments described herein. In particular, the computer programs, when executed, enable processor device 704 to implement the processes of the embodiments, such as the stages in the methods illustrated by flowchart 600 of FIG. 6, discussed above. Accordingly, such computer programs represent controllers of computer system 700. Where an embodiment is implemented using software, the software may be stored in a computer storage medium and loaded into computer system 700 using removable storage drive 714, interface 720, and hard disk drive 712, or communications interface 724.

Embodiments of the invention also may be directed to computer program products including software stored on any computer readable storage medium. Such software, when executed in one or more data processing device, causes a data processing device(s) to operate as described herein. Examples of computer readable storage mediums include, but are not limited to, primary storage devices (e.g., any type of random access memory) and secondary storage devices (e.g., hard drives, floppy disks, CD ROMS, ZIP disks, tapes, magnetic storage devices, and optical storage devices, MEMS, nanotechnological storage device, etc.).

CONCLUSION

The Summary and Abstract sections may set forth one or more but not all embodiments as contemplated by the inventor(s), and thus, are not intended to limit the present invention and the appended claims in any way.

The foregoing description of specific embodiments so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described example embodiments.

What is claimed is:

1. A computer-implemented method for matching multiple images in real-time as the images are received at a server having one or more processors, comprising:

receiving, at the one or more processors of the server, a first collection of photographic images and one or more additional collections of photographic images, each photographic image of the first collection of photographic images and the one or more additional collections of photographic images associated with metadata, wherein the metadata includes information related to at least a time of capture, a geolocation, and a field-of-view of a scene captured via an image capturing device, and further wherein at least one of the time of capture, the geolocation, or the field-of-view of each photographic image is different;

clustering, by the one or more processors of the server, the photographic images in the first collection into one or more composite sets of photographic images, wherein the clustering is based on a comparison of the metadata associated with each photographic image in the first collection meeting a predetermined similarity threshold;

determining, at the one or more processors of the server, an image overlap between each photographic image within each of the one or composite sets of photographic images, wherein an image overlap indicates a set of common features between a pair photographic images and includes at least a portion of an object captured in each of the photographic images of the pair;

when the image overlap exceeds a predetermined image overlap threshold, matching, at the one or more processors of the server, the pair of photographic images, for all of the photographic images within each composite set of photographic images to form one or more composite images associated with composite metadata; and for each of the one or more additional collections of photographic images: determining, by the one or more processors of the server, if the additional collection is a candidate to be matched with any of the photographic images of the first collection of images, based on a metadata comparison; and matching, by the one or more processors of the server, the additional collection to composite images from the first collection of photographic images when an image overlap exceeds the predetermined image overlap threshold.

2. The computer-implemented method of claim 1 further comprising:

comparing, at the server, an instant image of the first collection with a predetermined number of identified images of the first collection, the instant image being the image received at the server most recently in time and the identified images being the predetermined number of images received by the server prior to the instant image;

matching, by the server, the instant image to the predetermined number of identified images based on the predetermined image overlap threshold, wherein one or more composite images are formed; and matching, at the server, each of the composite images.

3. The computer-implemented method of claim 2, wherein a value for the predetermined number of identified images is based at least in part on a user input.

4. The computer-implemented method of claim 1, wherein clustering the photographic images in the first collection into one or more composite sets of photographic images comprises:

determining whether the metadata associated with each photographic image meets a predetermined similarity threshold with the metadata associated with another photographic image, wherein the similarity threshold is based on at least one of a duration of time or a geolocated area; and sorting the photographic images with associated metadata that meets the predetermined similarity threshold into the same composite set of photographic images.

5. The computer-implemented method of claim 1, wherein the predetermined similarity threshold is based on at least one of a duration of time or a geolocated area.

6. The computer-implemented method claim 1, wherein matching the pair of photographic images comprises:
   identifying, from the photographic images in a respective composite set, all pairs of photographic images whose image overlap exceeds the predetermined image overlap threshold;
   identifying the set of common features between each pair of photographic images, wherein the set of common features includes at least the portion of an object captured in the pair of photographic images; and
   matching each identified pair of photographic images within each composite set based on the identified set of common features to form a composite image for each composite set.

7. The computer-implemented method of claim 6 further comprising:
   comparing the composite metadata for each composite image;
   determining an image overlap between a pair of composite images when the metadata associated with each of the pair composite images meets a predetermined composite metadata similarity threshold; and
   matching each composite image from each composite set of photographic images, when the image overlap between the pair of composite images exceeds the predetermined image overlap threshold.

8. The computer-implemented method of claim 1, further comprising:
   generating, at the server, a panoramic tour based on the composite images; and
   generating, at the server, a navigational control for the generated panoramic tour.

9. A computer system for providing an incremental image processing pipeline for matching multiple images, the system comprising:
   a data manager module configured to receive a first collection of photographic images and one or more additional collections of photographic images, each photographic image of the first collection of photographic images and the one or more additional collections of photographic images associated with metadata, wherein the metadata includes information related to at least a time of capture, a geolocation, and a field-of-view of a scene captured via an image capturing device, and further wherein at least one of the time of capture, geolocation, or field-of-view of each photographic image is different;
   an image comparator configured to:
   cluster the photographic images in the first collection into one or more composite sets of photographic images, wherein the clustering is based on the metadata associated with each photographic image in the first collection meeting a predetermined similarity threshold; and
   determine an image overlap between each photographic image within each of the one or composite sets of photographic images, wherein an image overlap indicates a set of common features between a pair photographic images and includes at least a portion of an object captured in each of the photographic images of the pair; and
   an image compositor configured to match the pair of photographic images, for all of the photographic images within each composite set of photographic images to form one or more composite images associated with composite metadata when the image overlap exceeds a predetermined image overlap threshold;
   wherein, for each of the one or more additional collections of photographic images:
   the image comparator is further configured to determine if the additional collection is a candidate to be matched with any of the photographic images of the first collection of images, based on a metadata comparison; and
   the image compositor is further configured to match the additional collection to composite images from the first collection of photographic images when an image overlap exceeds the predetermined image overlap threshold.

10. The computer system of claim 9 wherein the image comparator is further configured to compare an instant image of the first collection with a predetermined number of identified images of the first collection, the instant image being the image received at the server most recently in time and the identified images being the predetermined number of images received prior to the instant image.

11. The computer system of claim 10, wherein the image compositor is further configured to match the instant image to the predetermined number of identified images based on the metadata similarity value and the predetermined image overlap threshold, wherein one or more additional composite images are formed and match each of the one or more additional composite images together.

12. The computer system of claim 10, wherein a value of the predetermined number of identified images is based at least in part on a user input.

13. The computer system of claim 9, wherein the image comparator is further configured to determine whether the metadata associated with each photographic image meets a predetermined similarity threshold with the metadata associated with another photographic image, wherein the similarity threshold is based on at least one of a duration of time or a geolocated area and sort the photographic images with associated metadata that meets the predetermined similarity threshold into the same composite set of photographic images.

14. The computer system method of claim 9, wherein the predetermined similarity threshold is based on at least one of a duration of time or a geolocated area.

15. The computer system of claim 9, wherein the image compositor is further configured to:
   identify, from the photographic images in a respective composite set, all pairs of photographic whose image overlap exceeds the predetermined image overlap threshold;
   identify the set of common features between each pair of photographic images, wherein the set of common features includes at least the portion of an object captured in the pair of photographic images; and
   match each identified pair of photographic images within each composite set based on the identified set of common features to form a composite image for each composite set.

16. The computer system of claim 15 wherein:
   the image comparator is further configured to:
   compare the composite metadata for each composite image; and
   determine an image overlap between a pair of composite images when the metadata associated with each of the pair of composite images meets a predetermined composite metadata similarity threshold; and
   the image compositor is further configured to match each composite image from each composite set of photographic images when the image overlap between the pair of composite images exceeds the predetermined image overlap threshold.

17. The computer system of claim 9, further comprising:
a navigation module configured to generate a panoramic tour based on the composite images and generate a navigational control for the generated panoramic tour.

18. A non-transitory computer-readable storage medium having instructions encoded thereon that, when executed by a computing device, cause the computing device to perform operations comprising:
  receiving a collection of photographic images, the collection of photographic images including a plurality of photographic images and each photographic image associated with a respective metadata, wherein each respective metadata includes information related to at least a field-of-view, a time of capture, and a geolocation at which its associated respective image was captured by a user, via an image capturing device, the perspective information of each respective image being different;
  comparing the associated metadata of an instant image from the collection with the associated metadata of a predetermined number of identified images from the collection, wherein the instant image is the photographic image received most recently in time and the identified images are the predetermined number of images received prior to the instant image;
  clustering the instant image and one or more of the identified images into the same of one or more composite sets of photographic images when the comparing of the associated metadata meets a predetermined metadata similarity threshold, wherein each of the one or more composite sets include the photographic images that are candidates to be matched;
  determining an image overlap between each photographic image within each of the one or composite sets, wherein a respective image overlap indicates a set of common features between a pair photographic images and includes at least a portion of an object captured in each of the photographic images of the pair; and
  when the image overlap exceeds a predetermined image overlap threshold:
  matching the pair of photographic images, for all of the photographic images within each composite set of photographic images to form one or more composite images associated with composite metadata.

* * * * *

UNITED STATES PATENT AND TRADEMARK OFFICE
CERTIFICATE OF CORRECTION

| | | |
|---|---|---|
| PATENT NO. | : 8,805,091 B1 | Page 1 of 1 |
| APPLICATION NO. | : 13/588681 | |
| DATED | : August 12, 2014 | |
| INVENTOR(S) | : Chase Hensel and Guiheng Zhou | |

It is certified that error appears in the above-identified patent and that said Letters Patent is hereby corrected as shown below:

In the Claims,

Column 24, line 47, between "photographic whose" insert -- images --.

Signed and Sealed this
Eighteenth Day of August, 2015

Michelle K. Lee
*Director of the United States Patent and Trademark Office*